(12) United States Patent
Wang et al.

(10) Patent No.: US 7,860,286 B2
(45) Date of Patent: Dec. 28, 2010

(54) MEDICAL IMAGE ACQUISITION ERROR DETECTION

(75) Inventors: Gang Wang, Frederick, MD (US); Bruce Jackson, Mukilteo, WA (US)

(73) Assignee: Microsoft Corporation, Redmond, WA (US)

(*) Notice: Subject to any disclaimer, the term of this patent is extended or adjusted under 35 U.S.C. 154(b) by 917 days.

(21) Appl. No.: 11/739,678

(22) Filed: Apr. 24, 2007

(65) Prior Publication Data

US 2008/0267473 A1 Oct. 30, 2008

(51) Int. Cl.
*G06K 9/00* (2006.01)
(52) U.S. Cl. .................................................. 382/128
(58) Field of Classification Search ............ 382/128, 382/132, 224, 228; 378/12; 348/92, 94, 348/95
See application file for complete search history.

(56) References Cited

U.S. PATENT DOCUMENTS

| | | | |
|---|---|---|---|
| 4,768,099 A | 8/1988 | Mukai | |
| 5,600,574 A * | 2/1997 | Reitan | 702/185 |
| 5,724,582 A | 3/1998 | Pelanek et al. | |
| 6,134,350 A | 10/2000 | Beck | |
| 6,463,417 B1 | 10/2002 | Schoenberg | |
| 6,631,204 B1 | 10/2003 | Smith | |
| 6,687,416 B2 | 2/2004 | Wang | |
| 6,801,645 B1 | 10/2004 | Collins | |
| 6,912,317 B1 | 6/2005 | Barnes et al. | |
| 6,937,767 B1 | 8/2005 | Burak et al. | |
| 7,003,164 B2 | 2/2006 | Takebe | |
| 7,043,474 B2 | 5/2006 | Mojsilovic et al. | |
| 7,068,848 B2 | 6/2006 | Park et al. | |
| 7,167,580 B2 * | 1/2007 | Klein et al. | 382/112 |
| 7,184,582 B2 * | 2/2007 | Giger et al. | 382/128 |

(Continued)

FOREIGN PATENT DOCUMENTS

JP 2004-290329 10/2004

OTHER PUBLICATIONS

Antonie, M.-L. O. R. Zaane, and A. Coman, Application of data mining techniques for medical image classification, Proc. of Second Intl. Workshop on Multimedia Data Mining (MDM/KDD'2001) in conjunction with Seventh ACM SIGKDD, 2001, pp. 94-101, San Francisco, USA.

(Continued)

*Primary Examiner*—Matthew C Bella
*Assistant Examiner*—Shervin Nakhjavan
(74) *Attorney, Agent, or Firm*—Lyon & Harr, LLP; Richard T. Lyon

(57) ABSTRACT

A medical image acquisition error detection technique is presented which exploits the special characteristics of medical images to detect possible errors. In general, the presented technique categorizes medical images based on the type of images. For each category, a type of standard image is computed which represents the typical characteristics of images within a category. Then, exemplary images in a category are compared to the standard image for that category to establish an acceptable difference between actual images and the standard image for the category under consideration. When a medical image is to be examined for possible acquisition errors, it is categorized and a measure of difference between the image and the standard image for the category is computed. If the measure of difference falls outside the acceptable difference for the category, the image is deemed to contain an acquisition error and an alert is issued.

20 Claims, 11 Drawing Sheets

U.S. PATENT DOCUMENTS

| | | | |
|---|---|---|---|
| 7,298,876 B1 * | 11/2007 | Marshall et al. | 382/128 |
| 7,647,087 B2 * | 1/2010 | Miga et al. | 600/425 |
| 7,672,491 B2 * | 3/2010 | Krishnan et al. | 382/128 |
| 2003/0160834 A1 | 8/2003 | Yamano et al. | |
| 2004/0165767 A1 | 8/2004 | Gokturk et al. | |
| 2005/0002547 A1 | 1/2005 | Torre-Bueno | |
| 2005/0207658 A1 | 9/2005 | Schofield | |
| 2005/0251013 A1 | 11/2005 | Krishnan et al. | |
| 2006/0029183 A1 | 2/2006 | Borghese et al. | |
| 2006/0053004 A1 | 3/2006 | Ceperkovic et al. | |
| 2006/0133650 A1 | 6/2006 | Xie et al. | |
| 2006/0274928 A1 | 12/2006 | Collins et al. | |
| 2008/0137969 A1 * | 6/2008 | Rueckert et al. | 382/224 |

OTHER PUBLICATIONS

Lehmann, T. M. and M.-O. Güld and T. Deselaers and D. Keysers and H. Schubert and K. Spitzer and H. Ney and B. Wein, Automatic categorization of medical images for content-based retrieval and data mining, Computerized Medical Imaging and Graphics, 2005, pp. 143-155, vol. 29, No. 2.

Tzannes, A., Compression of 3-dimensional medical image data using part 2 of JPEG 2000, available at http://medical.nema.org/Dicom/minutes/WG-04/2004/2004-02-18/3D_compression_RSNA_2003_ver2.pdf.

Gokturk, S. B., C. Tomasi, B. Girod, C. Beaulieu, Medical image compression based on region of interest, with application to colon CT images, Proc. 23rd Annual Int. Conf. IEEE Eng'g in Med. and Biology Soc'y, Oct. 2001, vol. 3, pp. 2453-2456, Istanbul, Turkey.

Pearlman, W., Medical Image Compression Systems, Center for Next Generation Video, Rensselaer Polytechnic Institute, Dec. 11, 2001.

International Search Report, Application No. PCT/US2008/061468, completed Aug. 21, 2008, received Aug. 21, 2008.

* cited by examiner

MEDICAL IMAGE ACQUISITION ERROR DETECTION

BACKGROUND

Current medical imaging techniques produce digital images that are invaluable for diagnosis and treatment of patients. For example, current medical imaging techniques include X-ray and angiography, computed radiography (CR), computed tomography (CT), magnetic resonance imaging (MRI), positron emission tomography (PET), ultrasound, and so on. However, operator errors are common in the acquisition of these types of medical images. For example, the medical images are sometimes mislabeled as to what body part is imaged or what imaging technique was used to generate an image. Another example of a common error derives from some medical images initially being captured using some physical medium such as a chemical-based film. These films are typically scanned to create a digital image. The scanning process often involves a technician manually loading the film into a scanner. A problem sometimes arises in that the technician accidentally loads the film into the scanner in the wrong orientation (e.g., upside down). Thus, the resulting digital image is mis-oriented. Another example of a possible error in the acquisition of the foregoing medical images involves images that are over or under exposed. They may even be completely dark or completely white.

Left undetected images exhibiting the foregoing, or other types of acquisition-based errors, may delay the care-giving process and may reduce the quality of the care given.

SUMMARY

The present medical image acquisition error detection technique exploits the special characteristics of medical images to detect possible errors so that a technician or caregiver can be alerted of the problem. In general, the present technique categorizes medical images based on the type of images. Medical images within the same category will typically have a very high level of similarity to each other. For each category, a type of standard image is computed which represents the typical characteristics of images within a category. Then, exemplary images in a category are compared to the standard image for that category to establish an acceptable difference between actual images and the standard image for the category under consideration. When a medical image is to be examined for possible acquisition errors, it is categorized and a measure of difference between the image and the standard image for the category is computed. If the measure of difference falls outside the acceptable difference for the category, the image is deemed to contain an acquisition error and an alert is issued.

It is noted that while the foregoing limitations in existing medical image acquisition techniques described in the Background section can be resolved by a particular implementation of the present technique, this is in no way limited to implementations that just solve any or all of the noted disadvantages. Rather, the present medical image acquisition error detection technique has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present medical image acquisition error detection technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, network PCs, minicomputers, mainframe computers, distributed computing environments that include any of the above systems or devices, and the like.

Figure 1:
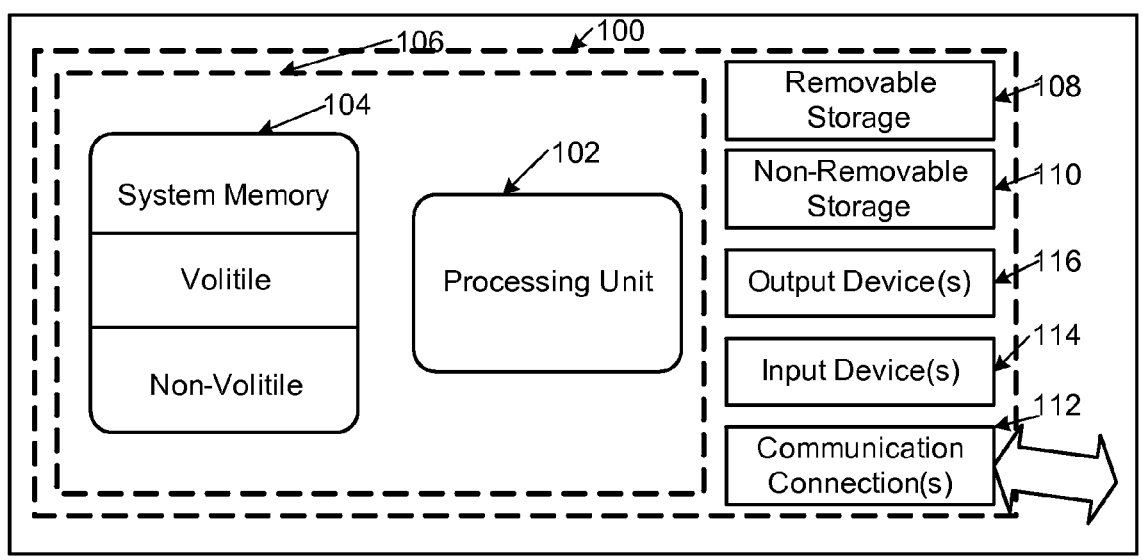
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present medical image acquisition error detection technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The present medical image acquisition error detection technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

2.0 Detection Of Acquisition Errors In Medical Images

Figure 2:
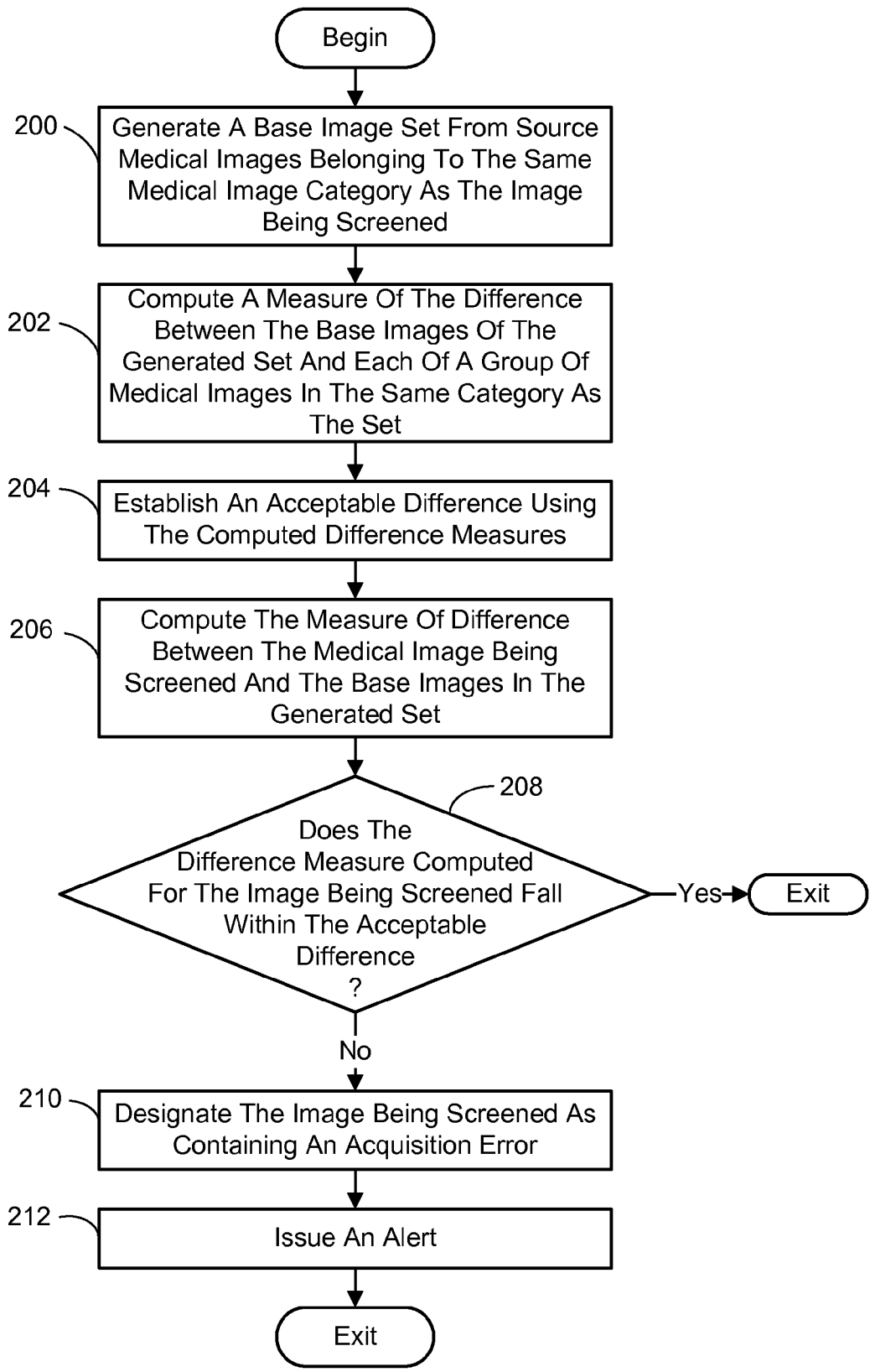
FIG. 2 is an overall flow diagram generally outlining one embodiment of a process for detecting acquisition errors in a medical image.

The exemplary operating environment having now been discussed, the remaining parts of this description section will be devoted to a description of the program modules embodying the present technique for detecting acquisition errors in medical images. Generally, this technique exploits the fact that medical images within the same category will exhibit a very high level of similarity to each other. More particularly, referring to FIG. 2, one embodiment of the present medical image acquisition error detection technique involves first generating a set of base images from a larger group of source medical images belonging to the same category as a medical image being screened for acquisition errors (200). These base images in the set substantially capture the variance exhibited amongst the group of source images and are orthogonal to each other. The set of base images collectively act as the aforementioned standard image for the associated medical image category, and will be described in more detail below. The image categories themselves and the source of the group of medical images will also be described in more detail shortly.

Next, for each of a group of medical images in the same category as those used to produce the base image set, a measure of the difference between the image under consideration and the base images in the computed set is determined (202). The computed measures are then used to establish an acceptable difference (204). The measure of difference between the medical image being screened for errors and the base images is computed next (206). It is then determined if the difference measure computed for the image being screened falls within the acceptable difference (208). If it does not, the image being screened is designated as containing an acquisition error (210), and an alert is issued (212).

2.1 Medical Image Acquisition Error Detection Architecture

Figure 3:
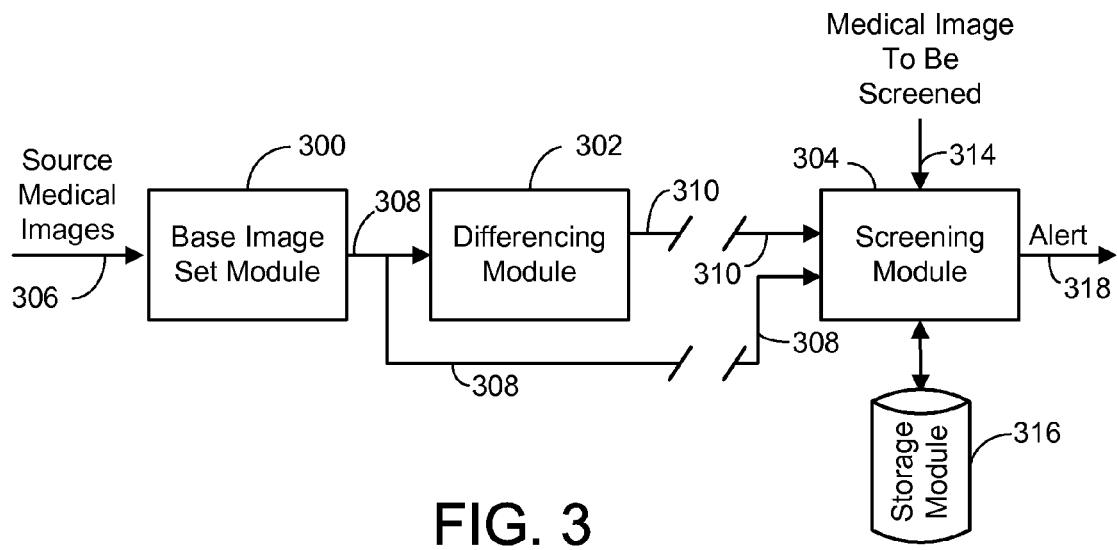
FIG. 3 is a block diagram depicting an idealized architecture for implementing the present technique.

In general, the present medical image acquisition error detection technique is embodied in an architecture that in one embodiment includes a base image set module (300), a differencing module (302) and a screening module (304), as shown in FIG. 3. These modules would run on one or more computing devices, such as those described in the foregoing computing environment section. In a pre-screening phase, the base image set module (300) takes in the aforementioned source medical images (306) and generates the base images sets (308) from them. The differencing module (302) takes the base image sets (306) and computes the aforementioned acceptable difference (310) for each set. The base image sets (308) and acceptable differences (310) are also made available to the screening module (304) for use in screening a medical image (314) for acquisition errors. In FIG. 3, the connection between the screening module (304) and the base image set and differencing modules (300, 302) is shown with a gap to indicate that this last task can be accomplished in a variety of ways. For example, if the screening module (304) is operating on the same computer as the base image set and differencing modules (300, 302), the base image sets (308) and acceptable differences (310) are provided directly to the screening module in a conventional manner. However, it is also possible that the screening module (304) is operating independently on a computer that is remote from the computer running the base image set and differencing modules (300, 302). This is quite feasible as a base image set and acceptable difference associated with a medical image category need only be computed once, and thereafter employed to screen images for acquisition errors whenever desired.

Thus, any computer running the screening module (304) could screen a medical image for acquisition errors if the base image set (308) and acceptable difference (310) associated with the same category as that medical image is available. To facilitate their use by a remote computer in screening for acquisition errors, the base image set module (300) outputs the base image sets (308), and the differencing module (302) outputs the acceptable differences (310), as illustrated in FIG. 3. This can entail a direct transfer to the screening module (304) via a computer network (not shown), such as the Internet or an intranet. Alternately, the base image set and differencing modules (300, 302) could output to a computer acting as a server (not shown) on a computer network. The screening module (304) would then include a capability to retrieve copies of the base image sets (308) and acceptable differences (310) from the server via the network. Another possibility not shown in FIG. 3, is that the base image sets (308) and acceptable differences (310) could be stored on any type of computer storage media such as described in the computing environment section, which would then be made accessible to the screening module (304).

In a screening phase, the screening module (304) inputs a medical image (314) that it is desired to screen for acquisition errors, along with the base image set (308) and acceptable difference (310) associated with the same category as the medical image. It is noted that the base image set (308) and acceptable difference (310) could be input on an as needed basis based on the category of the medical image being screened, or one or more base image sets and acceptable differences, up to the number generated by the base image set and differencing modules (300, 302), could be input in advance of inputting the medical image (314) and stored locally. If so, storage module (316) would be employed, and can be of any desired configuration that is available to the screening module (304). This latter scenario has the advantage of increasing the speed an image can be screened, but at the expense of storage space. If it is known what categories of images that are most likely to be screened, the screening module (304) can pre-download just the base image sets (308) and acceptable differences (310) associated with those medical image categories. Once the medical image (314) that is to be screened and at least the base image set (308) and acceptable difference (310) associated with the same medical image category as the image, are input, the image is screened for acquisition errors. If such an error is found, the screening module (304) issues an alert (318).

As indicated previously, the foregoing architecture can be employed in implementing the present medical image acquisition error detection technique in two phases—namely pre-screening and screening. Each of these phases will now be described in more detail in the sections to follow.

2.2 Pre-Screening Phase

The purpose of the pre-screening phase is to generate a base image set and acceptable difference for the category of the medical image it is desired to screen for acquisition errors. This can be accomplished immediately before a medical image is to be screened, or a significant amount of time before the screening is to take place.

Figure 4:
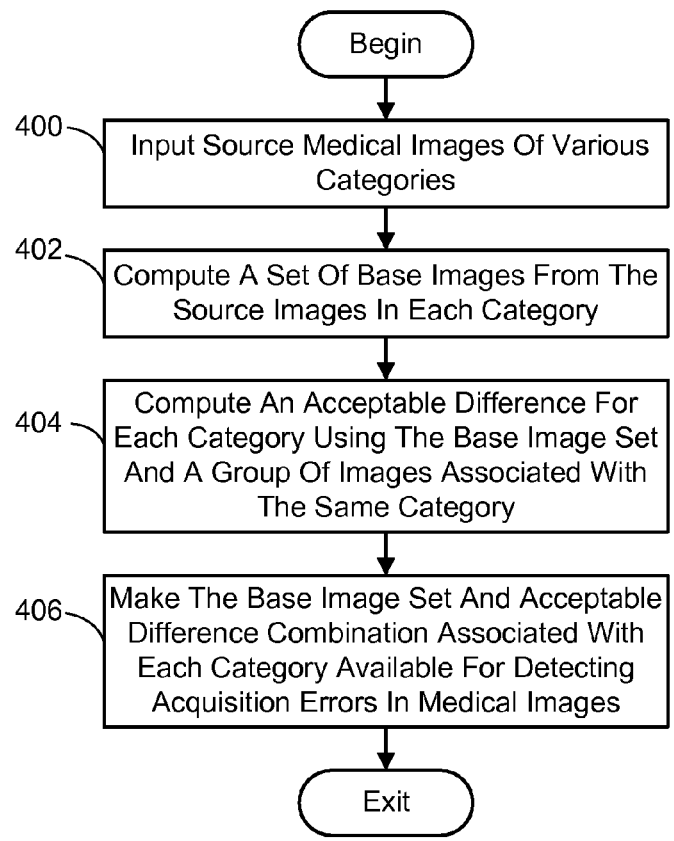
FIG. 4 is a flow diagram generally outlining one embodiment of a process for generating base image set and acceptable difference combinations for various medical image categories and making them available for acquisition error detection purposes in a pre-screening phase.

As mentioned previously, the base image sets and acceptable differences are computed just once and continually re-used to screen medical images associated with the same category. Thus, according to one embodiment of the present technique it is possible to compute a base image set and acceptable difference for multiple medical image categories of interest for screening purposes in advance to save time in the screening procedure. More particularly, referring to FIG. 4, in one embodiment this involves inputting medical images of various categories of interest from a source of medical images (400). Many such sources in the form of medical image databases currently exist. From the source images in each category, a set of base images is computed for that category (402), as will be described shortly. For each base image set generated, an acceptable difference is computed using the base image set and a group of medical images in the same category (404), as will also be described shortly. As indicated previously, the acceptable difference for a medical image category represents the degree to which an image being screened can deviate from the base image set before it is deemed to contain acquisition errors.

The result of the foregoing actions is to produce a base image set and acceptable difference combination for each medical image category of interest. These combinations are then made available for use in detecting acquisition errors in medical images (406), either locally or by a remote computing device. The base image set and acceptable difference combinations can be made available directly, through a computer network, or via a server over a computer network. Or alternately, the combinations could be made available by storing them on any type of computer storage media. Still further, the combinations could be established as an industrial standard.

Embodiments of the techniques used to generate each base image set and acceptable difference combination will now be described in more detail. The generation of a base image set will be described first, followed by the acceptable difference.

2.2.1 Base Image Set Generation

Figure 5:
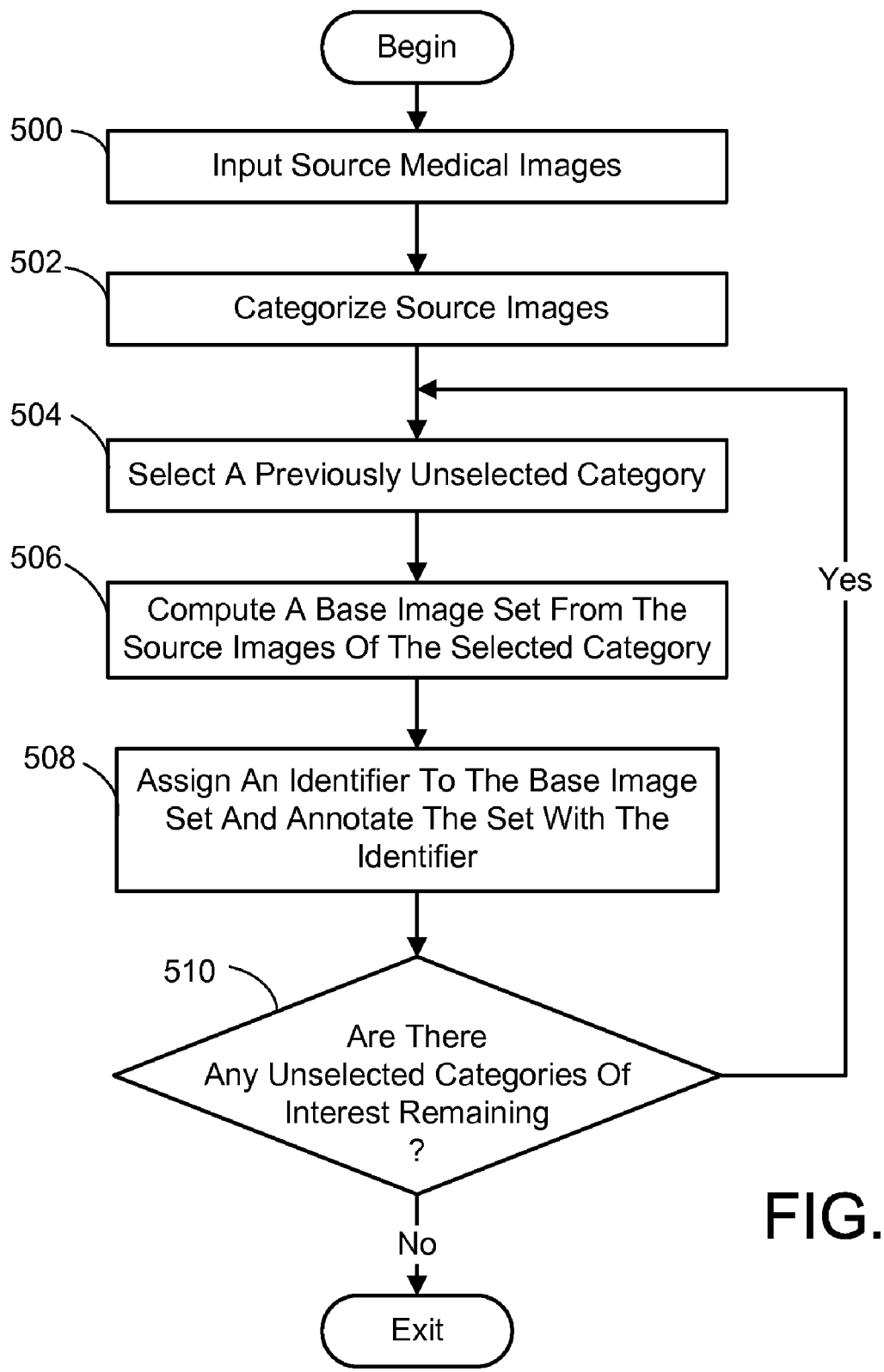
FIG. 5 is a flow diagram outlining one embodiment of a process for generating a base image set for each medical image category as part of the process of FIG. 4.

Referring to FIG. 5, one embodiment of the base image set generation task involves first inputting the aforementioned source medical images (500). These source images are chosen so that at least a minimum prescribed number of each of the desired medical image categories is represented—whether it be just one category or multiple categories. For example, in tested embodiments of the present technique, between 200 and 1000 images were used to generate a base image set for each image category. The medical images are obtained in a conventional manner from any number of medical image databases currently available. For example, commercially available Picture Archiving and Communication Systems (PACS) databases would be a good source for the medical images. These databases contain digital image files each of which has been annotated with characterizing metadata. For instance, by way of example and not limitation, these characterizations can include:

a) the type of image, such as CR/CT, MRI, Ultasound, PET, X-ray, Angiography, and so on;

b) the body part(s) or region that are the subject of the image (e.g., chest, abdomen, foot, and so on);

c) the gender of the patient;

d) the manufacturer and model of the equipment used to capture the image; and e) the resolution and pixel format of the image.

Typically, the characterizing metadata is in accordance with the Digital Imaging and Communications in Medicine (DICOM) standard.

Owing to the large number of images that typically exist in the aforementioned databases, it is desirable to just input those of interest. To this end, only those images having characteristics corresponding to the desired categories would be input. Typically, the medical image databases can be searched using one of more of the identifying characteristics, thereby allowing a user to input just the desired number of images in the categories corresponding to the type of medical images that are to be analyzed.

Once the source medical images are input, they are categorized using standard, well-known image categories (502). The user specifies what characteristic or characteristics a source image needs to have to qualify for a particular category. A previously unselected category is then selected (504) and a base image set is computed from the source images associated with the selected category (506). Each base image set computed includes a prescribed number of images that collectively capture the variance exhibited amongst the source images to a substantial degree. In addition, each image within a particular base image set is orthogonal to each other in that for any pair of images in the set, the dot product of vectors formed by concatenating the pixel values in each image is equal to zero. In tested embodiments, these characteristics were obtained using either a Singular Value Decomposition (SVD) procedure or a Principal Component Analysis (PCA) procedure. However, it is not intended to limit the present technique to just these two procedures. Any method that can produce base images having the foregoing characteristics can be employed as well. In tested embodiments, the prescribed number of images that were generated for each base image set varied between 12 and 16 with acceptable results, although numbers above or below this range can be employed as desired. It is noted that the SVD and PCA methods (as well as other methods) include a precursor procedure where before base images are computed from a group of images, an average image is computed for the group. The value of each pixel in the average image is the average value of all correspondingly located pixels from the group of images. The average image is subtracted from each image in the group of images, on a pixel-by-pixel basis. The SVD or PCA method is then applied to the resulting subtraction images. The average image will be needed to compute the acceptable difference and to screen medical images for acquisition errors. Therefore, the average image is included in the base image set.

Referring again to FIG. 5, the newly generated base image set is assigned a unique identifier and the set is annotated with this identifier (508). It is then determined if there are any remaining unselected medical image categories of interest (510). If so, actions 504 through 510 are repeated until all the categories of interest have a base image set associated with them.

2.2.2 Acceptable Difference Computation

Figure 6A:
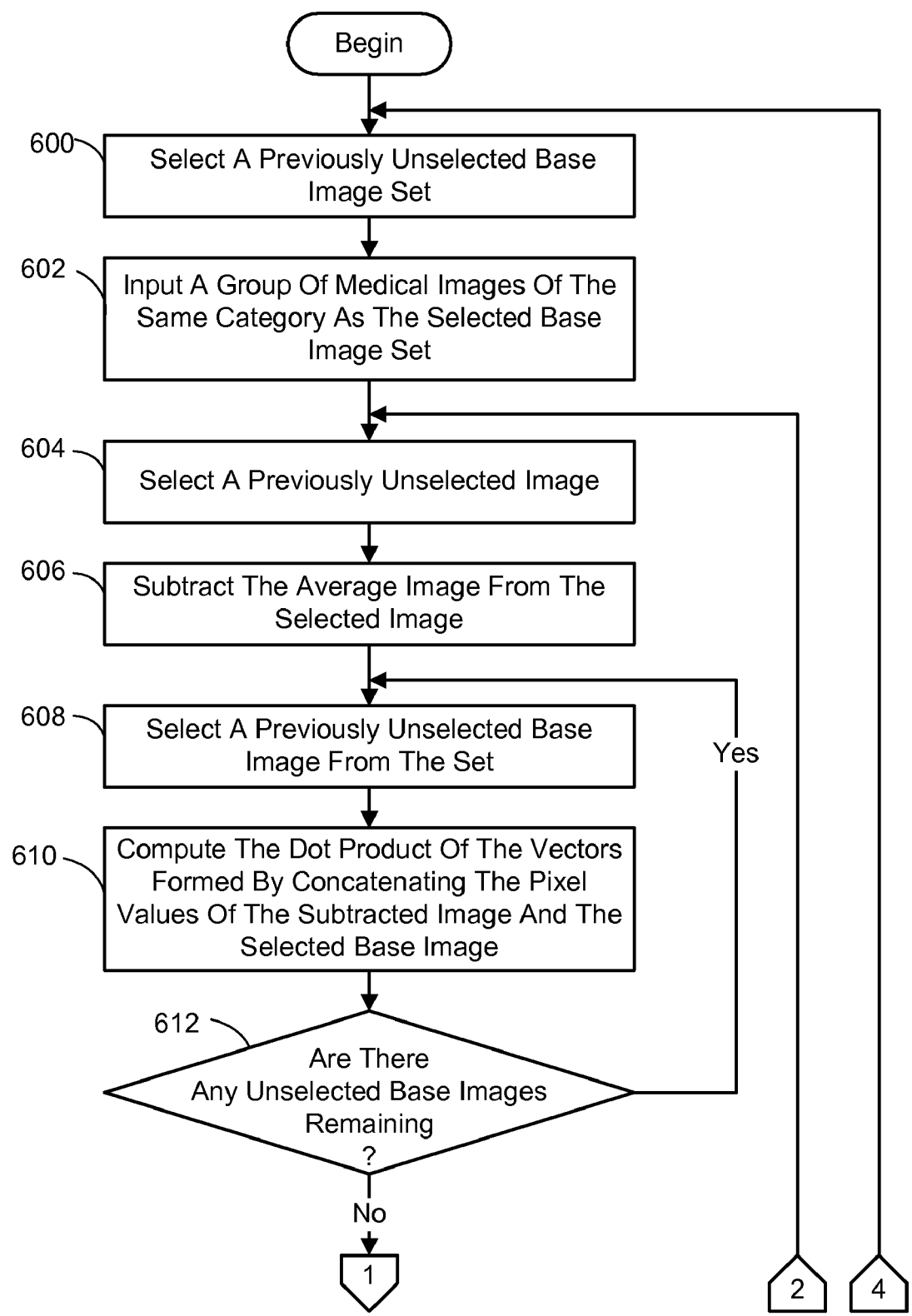
FIGS. 6A-C are a continuing flow diagram outlining one embodiment of a process for generating an acceptable difference for each medical image category as part of the process of FIG. 4.
Figure 6B:
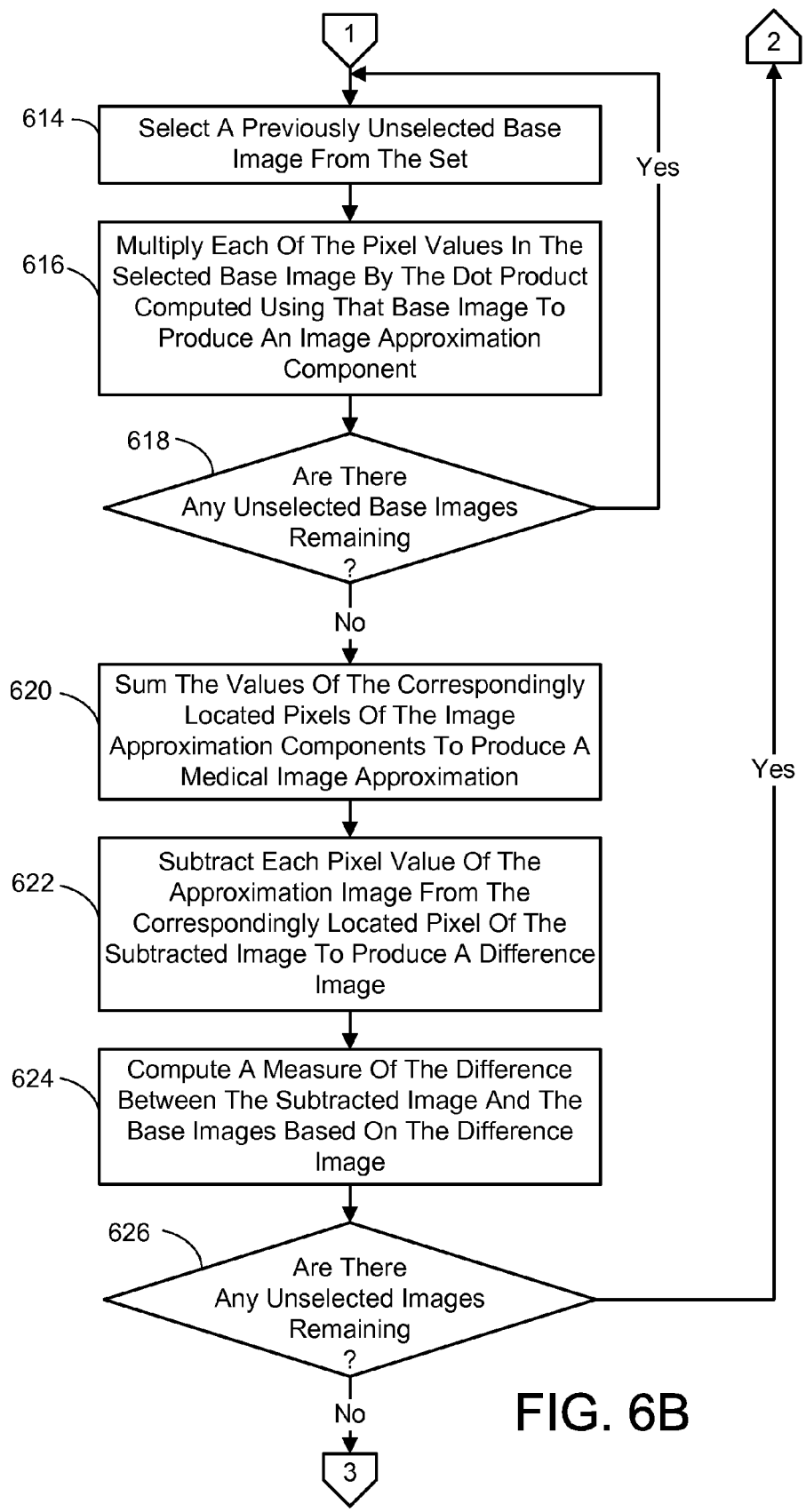
Figure 6C:
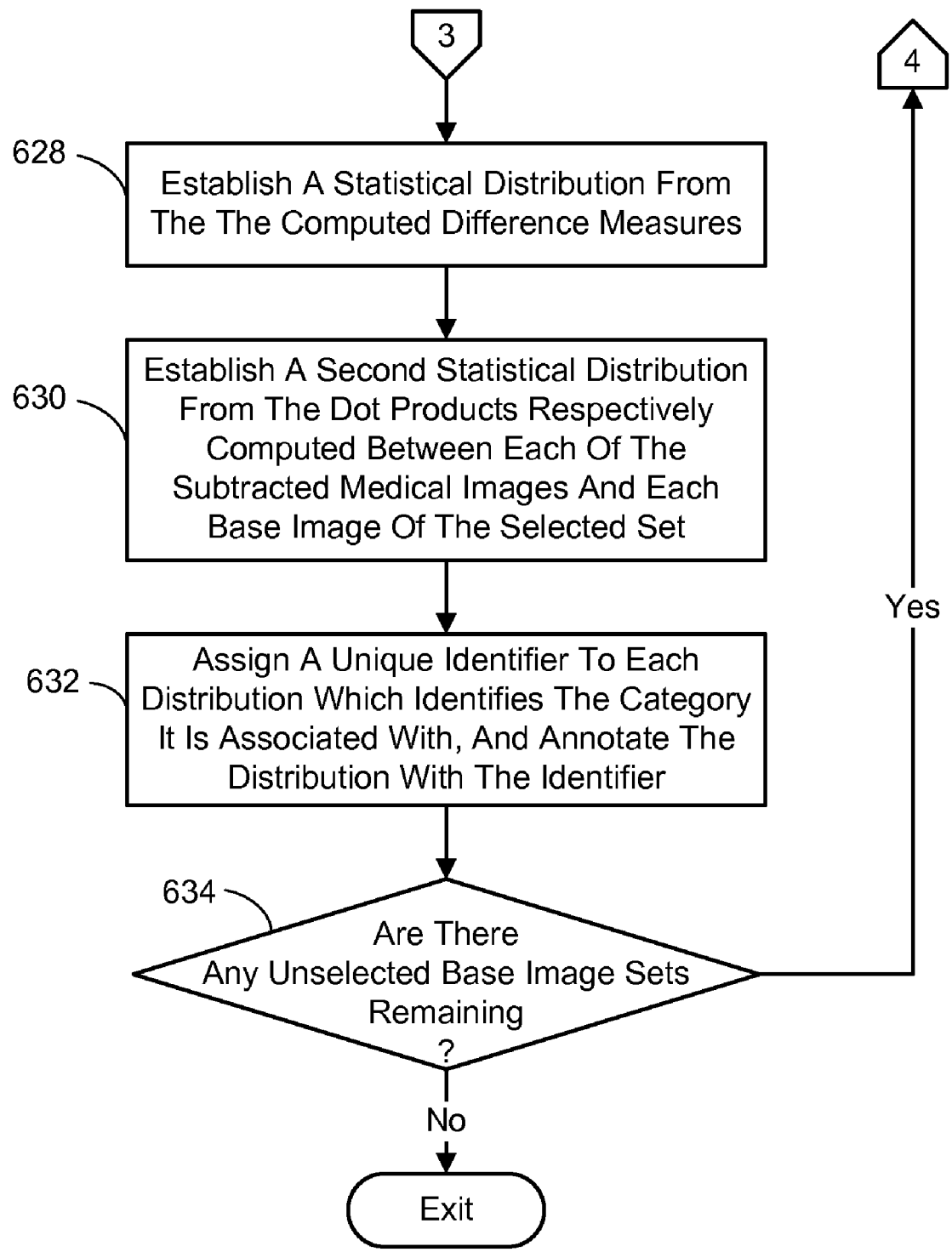

Referring to FIGS. 6A-C, in one embodiment of the present technique computing the acceptable difference for a medical image category involves first selecting a previously unselected base image set (600). These base image sets are the sets generated in the foregoing base image set generation task. If there is only one set, then that one is selected. Next, a prescribed number (e.g., between about 500 and about 1000) of medical images associated with in the same category as the selected base image set are input (602). These medical images are similar to the source images in that they are digital image files annotated with the same type of characterizing metadata (e.g., DICOM). Medical images belonging to a particular category are obtained from a medical image database as described previously. It is noted that some small number of these images might contain an acquisition error. However, as many images are used, statistically the erroneous images should not skew the results significantly. Although, if desired, known error-free images could be employed. Typically, these images would be reviewed manually to ensure they do not contain any acquisition errors. Further, the inputted images should not be duplicates of any of the images used to generate the selected base image set.

Next, a previously unselected one of the medical images is selected (604). The aforementioned average image, which is part of the selected base image set, is subtracted from the selected medical image (606). A previously unselected base image in the selected set is then selected (608), and the dot product of the vectors formed by concatenating the pixel values of the subtracted medical image and the selected base image is computed (610). It is then determined if there are any remaining unselected base images in the selected set (612). If so, actions (608) through (612) are repeated. When all the base images have been selected and processed, difference data is generated. In one embodiment of the present technique, this involves first selecting a previously unselected base image from the selected set (614) and multiplying each pixel of the selected base image by the previously computed dot product associated with that base image, to generate an image approximation component (616). It is then determined if there are any remaining unselected base images in the selected set (618). If so, actions (614) through (618) are repeated. When all the base images have been selected and processed, the values of each correspondingly located pixel of the image approximation components are summed to produce an approximation image (620). Each pixel value of the approximation image is then subtracted from the correspondingly located pixel of the currently selected subtracted medical image, to produce a difference image (622). A measure of the difference between the currently selected subtracted medical image and the base images is then computed based on the difference image (624). In one version of the present technique the measure of the difference is computed as the summation of the absolute values of pixel values of the difference image. In another version, the measure of the difference is computed as the summation of the square of the pixel values of the difference image. It should be noted that these ways of computing the measure of difference are meant to be examples only. Other ways of computing the measure can be employed as desired as long as the resulting measure represents the relative degree to which the currently selected subtracted medical image differs from the base images of the selected set.

Once the measure of difference is computed for the currently selected subtracted image, it is determined if there are any remaining images that have not yet been selected and processed (626). If so, actions (604) through (626) are repeated. When all the images have been selected, a group of difference measures will have been computed. This group of measures is used to establish a statistical distribution that represents the variation amongst images in a category and the base image set for that category (628). In tested embodiments, this distribution was presumed to be a standard beta distribution with shape parameters $\alpha=2$ and $\beta=5$. In addition, a second statistical distribution is established from the aforementioned dot products respectively computed between each of the subtracted medical images and each base image of the selected set (630). In tested embodiments, this second distribution was presumed to be a normal distribution. The second distribution provides an additional representation of the variation amongst images in a category and the base image set for that category. The first and second statistical distributions are used to provide the basis for the acceptable difference for the medical image category associated with the selected base image set, as will be described shortly.

Next, a unique identifier is assigned to each of the distributions, which identifies the medical image category it is associated with, and the distribution data is annotated with the identifier to allow for easy identification of its associated category (632). It is then determined if all the base image sets have been selected (634). If not, actions (600) through (634) are repeated. Otherwise, the acceptable difference computation technique ends.

2.3 Screening Phase

Figure 7A:
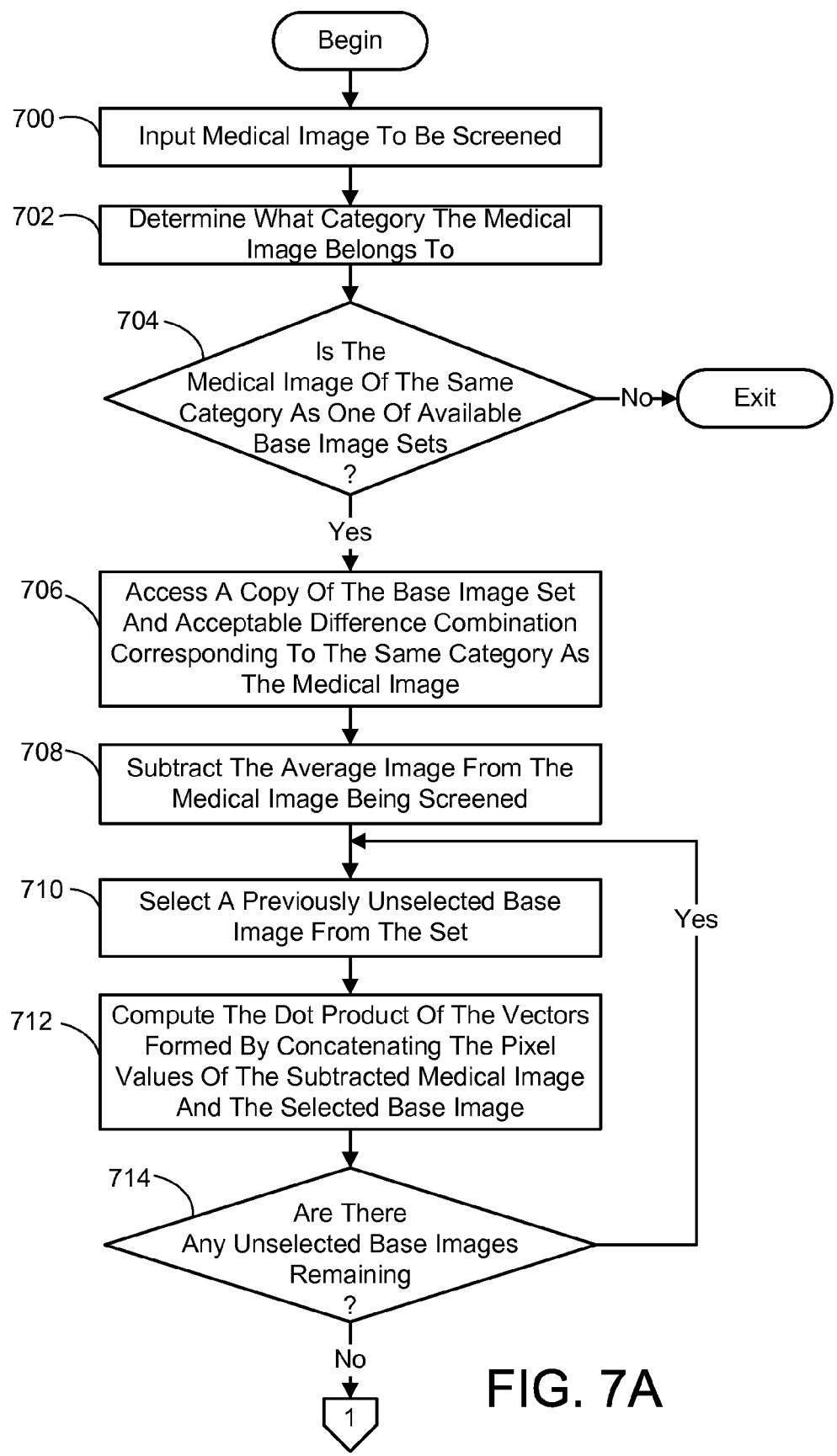
FIGS. 7A-C are a continuing flow diagram outlining one embodiment of a process for detecting acquisition errors in a medical image in a screening phase using the generated base image set and acceptable difference combinations.
Figure 7B:
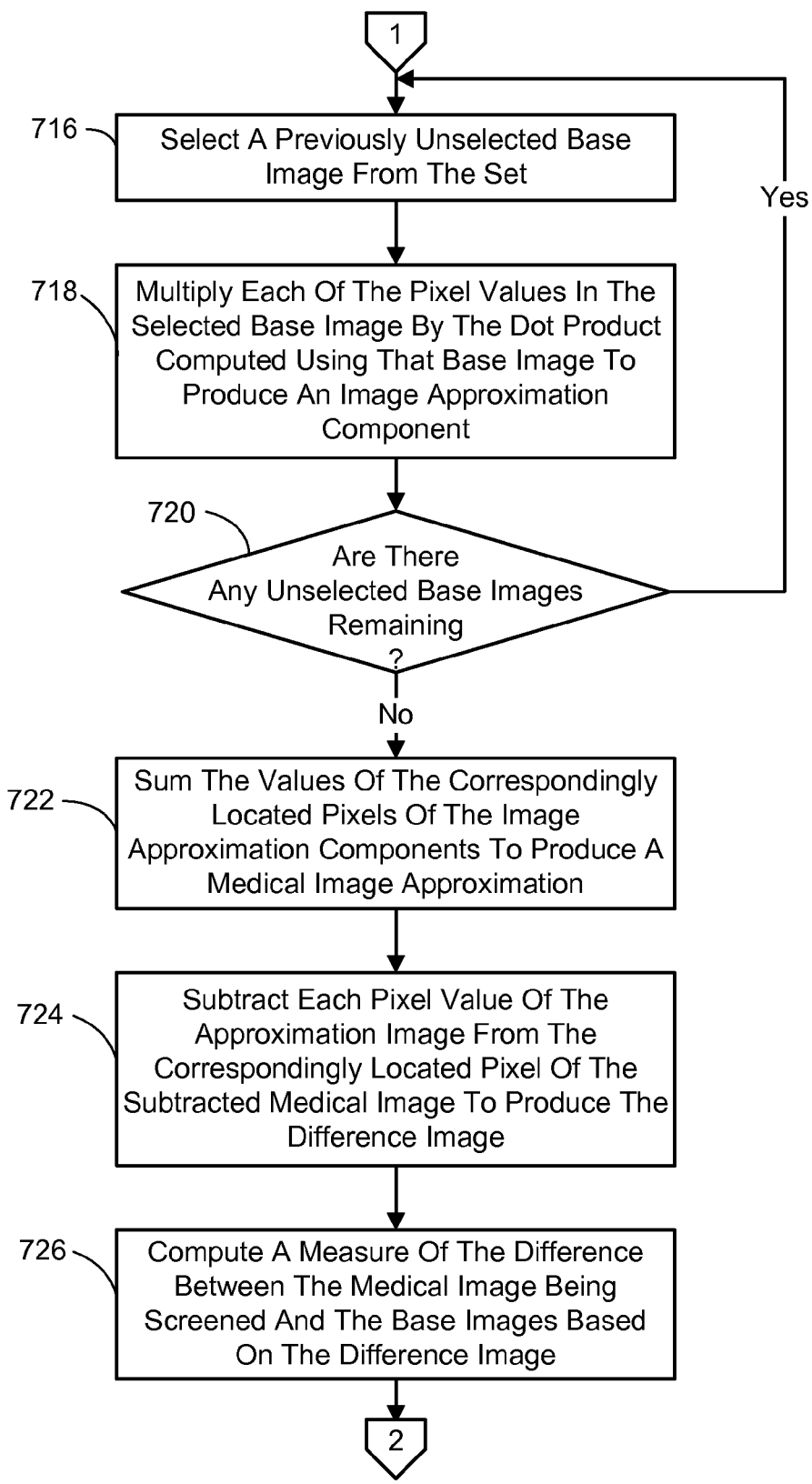
Figure 7C:
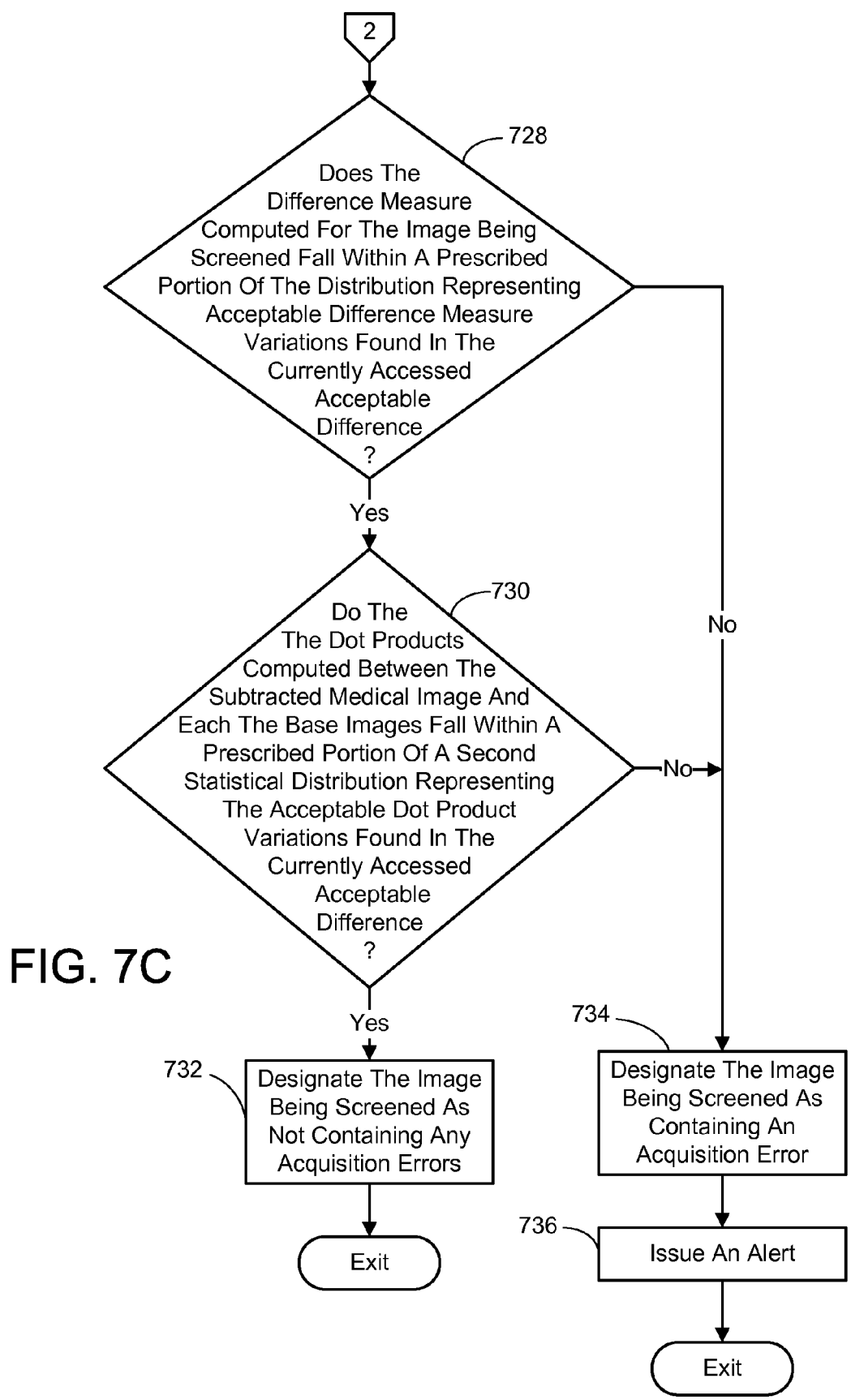

Once one or more of the base image set and acceptable difference combinations have been computed and made available, a medical image of the same category as one of the combinations can be screened for acquisition errors. Referring to FIGS. 7A-C, in one embodiment of the present technique this screening involves first inputting the medical image it is desired to screen (700). Here again, the medical image is similar to the source images in that it is a digital image file annotated with the same type of characterizing metadata (e.g., DICOM). Next, it is determined what category the medical image belongs to based on the metadata (702) and if the medical image is of the same category as one of available base image set-acceptable difference combinations (704). If not, the image cannot be screened and the procedure ends. On the other hand, if the medical image's category does match one of the available combinations, the matching base image set and corresponding acceptable difference are accessed (706). Access is achieved as previously described in the section concerning the medical image acquisition error detection architecture.

The next portion of the screening technique is similar to the part of the previously-described technique used to compute an acceptable difference for a medical image category. Specifically, the aforementioned average image, which is part of the accessed base image set, is subtracted from the medical image being screened (708). A previously unselected base image in the accessed set is then selected (710), and the dot product of the vectors formed by concatenating the pixel values of the subtracted medical image and the selected base image is computed (712). It is then determined if there are any remaining unselected base images in the selected set (714). If so, actions (710) through (714) are repeated. When all the base images have been selected and processed, difference data is generated using the subtracted medical image and the base images. In one embodiment of the present technique, this involves first selecting a previously unselected base image from the accessed set (716) and multiplying each pixel of the selected base image by the previously computed dot product associated with that base image, to generate an image approximation component (718). It is then determined if there are any remaining unselected base images in the accessed set (720). If so, actions (716) through (720) are repeated. When all the base images have been selected and processed, the values of each correspondingly located pixel of the image approximation components are summed to produce an approximation image (722). Each pixel value of the approximation image is then subtracted from the correspondingly located pixel of the subtracted medical image, to produce a difference image (724). A measure of the difference between the medical image being screened and the base images is then computed based on the difference image (726). This last task is accomplished in the same way the difference measures were computed in connection with the foregoing technique for computing an acceptable difference. For example, the measure of the difference could be computed as the summation of the absolute values of pixel values of the difference image, or as the summation of the square of the pixel values of the difference image.

The computed difference measure is compared to the acceptable difference associated with the category of the medical image being screened to determine if the image contains acquisition errors. In one embodiment of the screening technique, this involves first determining whether the computed difference measure falls within the statistical distribution representing the acceptable difference measure variations found in the acceptable difference associated with the category of the medical image being screened (728). If the distribution is presumed to be a beta distribution with shape parameters $\alpha=2$ and $\beta=5$, the computed difference measure is deemed to fall within the distribution if it is in a range extending a prescribed number of standard deviations from the mean. For example, in tested embodiments of the present screen technique, the computed difference measure was deemed to fall within the distribution if it was in a range extending three standard deviations from the mean (although the range could be extended as desired but at the cost of potentially failing to detect some error images). In addition, it is determined if the dot products computed between the subtracted medical image and each the base images fall within the aforementioned second statistical distribution that represents the acceptable dot product variations associated with the category of the image being screened (730). If this second distribution is presumed to be a normal distribution, the computed dot products are deemed to fall within the distribution if they are all in a range extending a prescribed number of standard deviations from the mean. For example, in tested embodiments of the present screen technique, the dot products were deemed to fall within the second distribution if they were in a range extending three standard deviations from the mean (although here again the range could be extended as desired but at the cost of potentially failing to detect some error images).

If the computed difference measure and dot products fall within their respective distributions, the image being screened is deemed not to contain acquisition errors (732), and the screening technique ends. However, if the computed difference measure, or any of the dot products, fall outside their respective distributions, the image being screened is designated as containing an acquisition error (734). Whenever the image being screened is designated to contain an acquisition error, an alert is issued (736). The alert can be issued in any number of conventional ways using the computer running the present screening technique with the intent to notify the person or persons performing the screening about the acquisition error.

3.0 Other Embodiments

In cases where the acquisition error exhibited by a medical image derives from it being mislabeled, such as to what body part is imaged or what imaging technique was used, an opportunity exists to identify the image's correct category. This opportunity arises when more than one base image set and acceptable difference combination is produced. When it is determined that a possibly mislabeled image contains an acquisition error as described previously, an additional technique could optionally be implemented to compute its difference measure in relation to other base image sets. It would then be determined if the difference measure computed for one of the other base image sets falls within the distribution representing the acceptable difference associated with that set. If so it can be suggested that the image actually belongs to the category associated with this other base image set and acceptable difference combination, rather than its selected category. This technique could be implemented using the previously described screening module.

Figure 8:
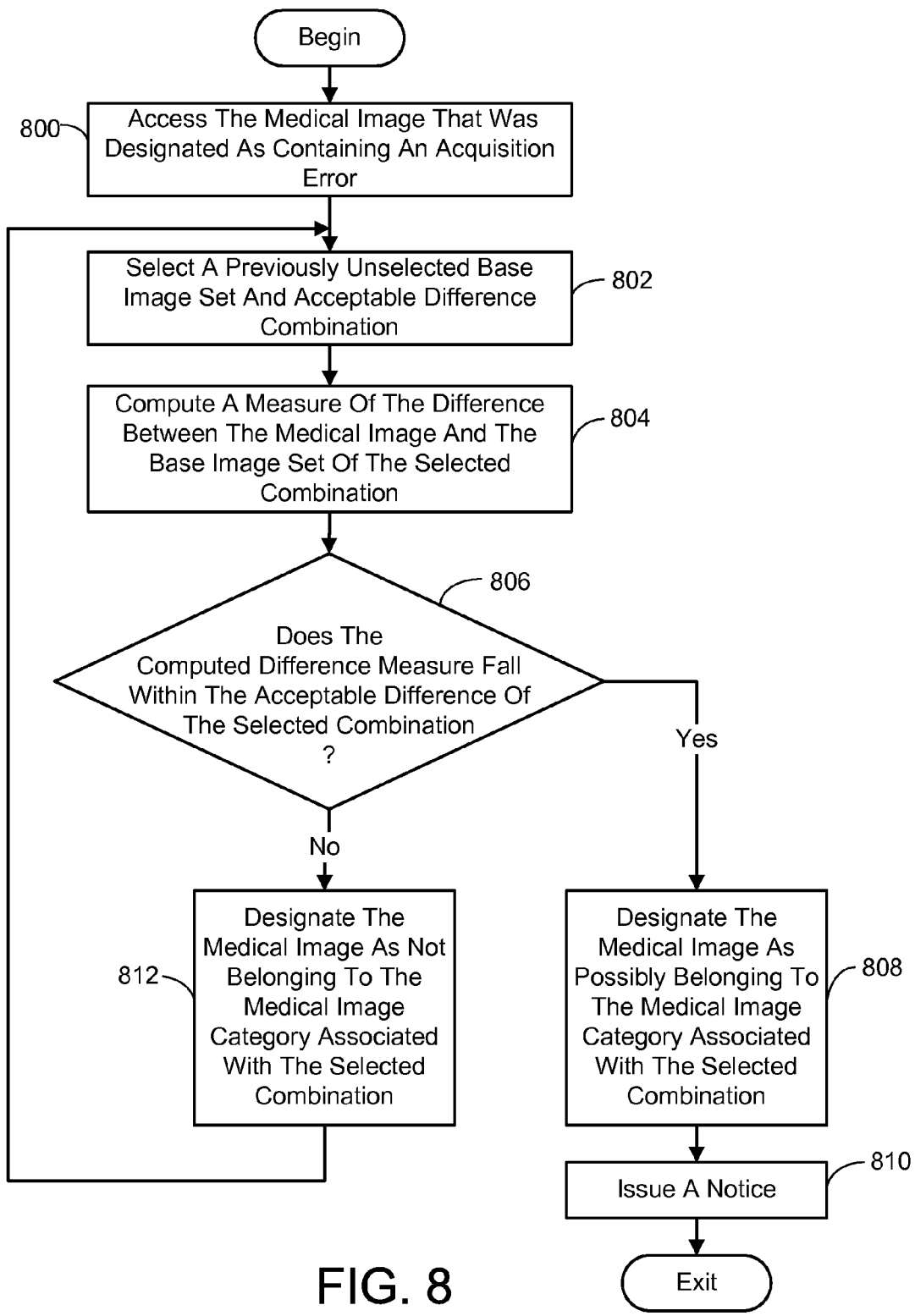
FIG. 8 is a flow diagram outlining one embodiment of an optional process for determining a possible medical image category for an image that is suspected of being mislabeled.

More particularly, referring to FIG. 8, one embodiment of the foregoing optional technique involves first accessing the medical image that was designated as containing an acquisition error and which is suspected of being mislabeled (800). A previously unselected base image set and acceptable difference combination is then selected, excluding the combination associated with the category currently assigned to the medical image (802). The next portion of this optional technique is similar to the screening technique. More particularly, a measure of the difference between the medical image and the base image set of the selected combination is computed (804). It is next determined whether the computed difference measure falls within the acceptable difference of the selected combination (806). If the computed difference measure falls within acceptable difference, the medical image is designated as possibly belonging to the medical image category associated with the selected combination (808), and a notice is issued to that effect (810). If it does not, the image is deemed not to belong to the category associated with the selected combination (812), and actions (802) through (812) are repeated as necessary until all the combinations have been considered.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for detecting acquisition errors in a medical image, comprising:
   using a computer to perform the following process actions:
   generating a set of base images from a larger group of source medical images belonging to a same category as a medical image being screened for acquisition errors, wherein the base image set substantially captures the variance exhibited amongst the group of source images;
   for each of a group of medical images in the same category as those used to generate the base image set, computing a measure of a difference between the medical image from said group of medical images in the same category as those used to generate the base image set, and the base images in the generated set;
   establishing an acceptable difference between the base images in the generated set and a medical image associated with the same category as those used to generate the base image set, using the computed difference measures;
   computing a measure of a difference between the medical image being screened for acquisition errors and the base images in the generated set;
   determining if the difference measure computed for the image being screened for acquisition errors falls within the established acceptable difference; and
   whenever the difference measure computed for the image being screened for acquisition errors does not fall within the established acceptable difference, issuing an alert that the image being screened for acquisition errors contains an acquisition error.

2. The process of claim 1, wherein the set of base images further comprises an average image which is computed by averaging the values of each correspondingly located pixel in the group of images used to compute the base images, and wherein the process action of computing a measure of a difference between the the medical image being screened for acquisition errors and the base images in the generated set, comprises the actions of:
   subtracting the average image from the medical image to produce a subtracted image;
   for each base image in the set of base images,
      computing the dot product of the vectors formed by concatenating the pixel values of the subtracted image and the base image;
      multiplying each pixel of the base image by the dot product associated with that base image to generate an image approximation component;
   summing the values of each correspondingly located pixel of the image approximation components to produce an approximation image;
   subtracting each pixel value of the approximation image from the correspondingly located pixel of the subtracted image to produce a difference image; and
   computing the measure of the difference between the subtracted image and the base images based on the difference image, wherein the difference measure represents the relative degree to which the subtracted image differs the base images.

3. The process of claim 2, wherein the process action of computing the measure of the difference between the subtracted image and the base images, comprises the action of either summing the absolute values of pixel values of the difference image, or summing the square of the pixel values of the difference image.

4. The process of claim 2, wherein the process action of establishing the acceptable difference between the base images in the generated set and a medical image associated with the same category, comprises an action of establishing a statistical distribution of the difference measures that represents the variation amongst the medical images and the base image set.

5. The process of claim 4, wherein the process action of determining if the difference measure computed for the image being screened for acquisition errors falls within the established acceptable difference, comprises the actions of:
   determining whether the difference measure computed for the image being screened for acquisition errors falls within a prescribed portion of the statistical distribution representing the acceptable difference associated with the category of the medical image being screened for acquisition errors;
   whenever the difference measure computed for the image being screened for acquisition errors does fall within the prescribed portion of the statistical distribution representing the acceptable difference associated with the category of the medical image being screened for acquisition errors, deeming that the image being screened for acquisition errors does not to contain acquisition errors; and
   whenever the difference measure computed for the image being screened for acquisition errors does not fall within the prescribed portion of the statistical distribution representing the acceptable difference associated with the category of the medical image being screened for acquisition errors, designating the image being screened for acquisition errors as containing an acquisition error.

6. The process of claim 4, wherein the process action of computing a measure of a difference between the medical image being screened for acquisition errors and the base images in the generated set, comprises the actions of:
   subtracting the average image from the medical image being screened for acquisition errors to produce a subtracted image;
   for each base image in the set of base images,
      computing the dot product of the vectors formed by concatenating the pixel values of the subtracted image and the base image;
      multiplying each pixel of the base image by the dot product associated with that base image to generate an image approximation component;

summing the values of each correspondingly located pixel of the image approximation components to produce an approximation image;

subtracting each pixel value of the approximation image from the correspondingly located pixel of the subtracted image to produce a difference image; and computing the measure of the difference between the subtracted image and the base images based on the difference image, wherein the difference measure represents the relative degree to which the subtracted image differs from the base images.

7. The process of claim 6, wherein the process action of establishing the acceptable difference between the base images in the generated set and a medical image associated with the same category as those used to generate the base image set, further comprises an action of establishing a second statistical distribution of the dot products computed from the vectors formed by concatenating the pixel values of the subtracted image and the base images, said second statistical distribution further representing the variation amongst the medical images and the base image set.

8. The process of claim 7, further comprising the process actions of:

determining whether all the dot products computed for the image being screened for acquisition errors falls within a prescribed portion of the second statistical distribution further representing the acceptable difference associated with the category of the medical image being screened for acquisition errors;

whenever all the dot products computed for the image being screened for acquisition errors fall within the prescribed portion of the second statistical distribution, deeming that the image being screened for acquisition errors does not to contain acquisition errors; and whenever one of the dot products computed for the image being screened for acquisition errors does not fall within the prescribed portion of the second statistical distribution, designating the image being screened for acquisition errors as containing an acquisition error and issuing an acquisition error alert.

9. A system for facilitating the detection of an acquisition error in medical images, comprising:

a general purpose computing device;

a computer program comprising program modules executable by the computing device, wherein the computing device is directed by the program modules of the computer program to, input source medical images of various categories, for each category of source images, compute a set of base images from the source images associated with the category of source images, wherein the base image set substantially captures the variance exhibited amongst the source images associated with the category of source images, and compute an acceptable difference representing a degree to which a medical image being screened for acquisition errors can deviate from the base image set associated with the same category as the medical image being screened for acquisition errors before it is deemed to contain an acquisition error; and make a base image set and acceptable difference combination associated with each category of source images available for acquisition error detection purposes.

10. The system of claim 9, wherein the source medical images are obtained from a medical image database wherein each image file in the database has been annotated with characterizing metadata which identifies characteristics of each image, and wherein the program module for inputting source medical images of various categories, comprises a sub-module for inputting only those source medical images that based on the characterizing metadata belong to categories it is anticipated the images which are to be screened for acquisition errors will share.

11. The system of claim 9, wherein the program module for computing a set of base images for each category of the source images, comprises sub-modules for:

categorizing the input source images, and for each category of source images, computing a set of base images from the source images associated with the category of source images, wherein the base image set substantially captures the variance exhibited amongst the source images associated with the category of source images and wherein the base images are orthogonal to each other, and assigning a unique identifier to the set of base images computed using the source images associated with the category of source images and annotating the base image set with the identifier, wherein the identifier indicates what medical image category the computed base image set is associated with.

12. The system of claim 11, wherein each set of base images further comprises an average image which is computed by averaging the values of each correspondingly located pixel in the group of images used to compute the base images in the set, and wherein the program module for computing the acceptable differences, comprises, for each medical image category, sub-modules for:

inputting a group of medical images associated with the medical image category;

for each medical image, subtracting the average image from the medical image to produce a subtracted image, for each base image in the set of base images associated with the medical image category, computing the dot product of the vectors formed by concatenating the pixel values of the subtracted image and the base image, and multiplying each pixel of the base image by the dot product associated with that base image to generate an image approximation component, summing the values of each correspondingly located pixel of the image approximation components to produce an approximation image, subtracting each pixel value of the approximation image from the correspondingly located pixel of the subtracted image to produce a difference image, and computing the measure of the difference between the subtracted image and the base images based on the difference image, wherein the difference measure represents the relative degree to which the subtracted image differs the base images;

establishing a statistical distribution of the computed difference measures that represents the variation amongst the medical images and the base image set associated with the medical image category; and designating a prescribed portion of the established statistical distribution as the acceptable difference for the medical image category.

13. The system of claim 12, wherein the sub-module for computing the measure of the difference between the subtracted image and the base images, comprises a sub-module for either summing the absolute values of pixel values of the difference image, or summing the square of the pixel values of the difference image.

14. The system of claim 12, wherein the program module for computing the acceptable differences, further comprises, for each medical image category, a sub-module for establishing a second statistical distribution of the dot products computed from the vectors formed by concatenating the pixel values of the subtracted image and the base images, said second statistical distribution further representing the variation amongst the medical images and the base image set.

15. The system of claim 9, wherein the program module for making the base image set and acceptable difference combination associated with each category of source images available, comprises a sub-module for one of (i) publishing the base image sets to an Internet or intranet site, or (ii) providing them upon request over a computer network from a server.

16. A process for detecting an acquisition error in a medical image, comprising:
using a computer to perform the following process actions:
inputting the medical image it is desired to screen for an acquisition error;
determining what medical image category the inputted image belong;
accessing an image base set and acceptable difference combination that is associated with the same medical image category as the inputted medical image, wherein the set of base images substantially captures the variance exhibited amongst a group of source medical images associated with the same category as the set, and each corresponding acceptable difference in the combination represents a degree to which a medical image associated with the same category as the combination can deviate from the base image set associated with that category before it is deemed to contain an acquisition error; and
computing a measure of a difference between the medical image being screened for an acquisition error and the base image set associated with same category as the medical image;
determining if the difference measure computed for the image being screened falls within the acceptable difference associated with same category as the medical image; and
whenever the difference measure computed for the image being screened does not fall within the acceptable difference associated with same category as the medical image, issuing an alert that the image being screened contains an acquisition error.

17. The process of claim 16, wherein an acceptable difference is defined as a prescribed portion of a statistical distribution of difference measures that represents the variation amongst the medical images and the base image set associated with the same medical image category, and wherein the process action of determining if the difference measure computed for the image being screened falls within the acceptable difference associated with same category as the medical image, comprises an action of determining whether the difference measure computed for the image being screened falls within the prescribed portion of the statistical distribution representing the accessed acceptable difference.

18. The process of claim 17, wherein each set of base images further comprises an average image which is computed by averaging the values of each correspondingly located pixel in the group of images used to compute the base images in the set, and wherein the process action of computing a measure of a difference between the medical image being screened and the base images in the generated set, comprises the actions of:
subtracting the average image from the medical image being screened to produce a subtracted image;
for each base image in the set of base images,
computing the dot product of the vectors formed by concatenating the pixel values of the subtracted image and the base image under consideration;
multiplying each pixel of the base image under consideration by the dot product associated with that base image to generate an image approximation component;
summing the values of each correspondingly located pixel of the image approximation components to produce an approximation image;
subtracting each pixel value of the approximation image from the correspondingly located pixel of the subtracted image to produce a difference image; and
computing the measure of the difference between the subtracted image and the base images based on the difference image, wherein the difference measure represents the relative degree to which the subtracted image differs from the base images.

19. The process of claim 18, wherein the acceptable difference is further defined by a prescribed portion of a second statistical distribution of the dot products computed from the vectors formed by concatenating the pixel values of the subtracted image and the base images, and wherein the process further comprises process actions of:
determining if the dot products computed for the image being screened falls within the prescribed portion of the second statistical distribution associated with same category as the medical image; and
whenever one of the dot products computed for the image being screened does not fall within the prescribed portion of the second statistical distribution, issuing an alert that the image being screened contains an acquisition error.

20. The process of claim 16, further comprising the actions of:
accessing at least one additional image base set and acceptable difference combination whenever the difference measure computed for the image being screened does not fall within the acceptable difference associated with same category as the medical image, wherein each additional combination accessed is associated with a different medical image category;
for each additional combination accessed,
computing a measure of the difference between the medical image and the base image set of the combination under consideration, and
determining if the difference measure computed for the medical image falls within the acceptable difference of the combination under consideration; and
whenever the difference measure computed for the medical image does fall within the acceptable difference associated with one of the additional combinations accessed, issuing a notification that the medical image may be in the category associated with that combination.

* * * * *